United States Patent
Nguyen

Patent Number: 6,134,645
Date of Patent: Oct. 17, 2000

[54] INSTRUCTION COMPLETION LOGIC DISTRIBUTED AMONG EXECUTION UNITS FOR IMPROVING COMPLETION EFFICIENCY

[75] Inventor: Dung Quoc Nguyen, Austin, Tex.

[73] Assignee: International Business Machines Corporation, Armonk, N.Y.

[21] Appl. No.: 09/087,886

[22] Filed: Jun. 1, 1998

[51] Int. Cl.[7] .................................................. G06F 9/00
[52] U.S. Cl. ........................ 712/23; 712/26; 712/205; 712/231; 712/239; 712/240
[58] Field of Search ..................... 712/23, 26, 205, 712/214, 232, 233, 234, 239, 240, 231, 235

[56] References Cited

U.S. PATENT DOCUMENTS

| | | | |
|---|---|---|---|
| 4,318,173 | 3/1982 | Freeman et al. | 712/23 |
| 5,388,219 | 2/1995 | Chan et al. | 712/217 |
| 5,481,683 | 1/1996 | Karim | 712/217 |
| 5,758,117 | 5/1998 | Patel et al. | 712/217 |
| 5,764,971 | 6/1998 | Shang et al. | 712/244 |
| 5,802,340 | 9/1998 | Mallick et al. | 395/394 |
| 5,841,999 | 11/1998 | Le et al. | 712/217 |
| 5,875,326 | 2/1999 | Cheong et al. | 395/591 |
| 5,887,161 | 3/1999 | Cheong et al. | 395/591 |

*Primary Examiner*—John A. Follansbee
*Assistant Examiner*—Dzung Nguyen
*Attorney, Agent, or Firm*—Anthony V. S. England; Felsman, Bradley, Vaden, Gunter & Dillon, LLP

[57] ABSTRACT

Each execution unit within a superscalar processor has an associated completion table that contains a copy of the status of all instructions dispatched but not completed. A central completion table maintains the status of every dispatched instruction as reported by the dispatch unit and the individual execution units. Execution units send finish signals to the completion table responsible for retiring a particular type of instruction. The central completion table retires instructions that may cause an interrupt and instructions whose results may target the same register. The execution units' associated completion tables retire the balance of the instructions and the execution units send instruction status to the central completion table and to each execution unit. This reduces the number of instructions that are retired by the central completion table, increasing the number of instructions retired per clock cycle.

26 Claims, 5 Drawing Sheets

INSTRUCTION COMPLETION LOGIC DISTRIBUTED AMONG EXECUTION UNITS FOR IMPROVING COMPLETION EFFICIENCY

BACKGROUND OF THE INVENTION

1. Technical Field

The present invention relates generally to a superscalar processor and in particular to increasing completion of more instructions per cycle. Still more particularly, the invention relates to improving the instruction completion scheme and completion unit of the superscalar processor.

2. Description of the Related Art

Microprocessors are classified as superscalar if the microprocessor ("processor") is capable of completing multiple instructions per clock cycle. The architecture of a superscalar processor utilizes multiple parallel processing units within the processor to allow completion of more multiple instructions per clock cycle. These processing units generally include multiple execution units operating in parallel, a dispatch unit for sending instructions and data to the execution units, a completion unit containing a ("completion table") for tracking and retiring the instructions and rename buffers (rename registers) for preloading instructions for the execution units. The tracking and retiring feature of the completion table provides for completing instructions out of order.

Utilizing multiple parallel processing units requires, for efficiency and speed, that instructions be "pipelined." Pipelining is a method of fetching and decoding instructions so that an execution unit does not have to wait for instructions; the execution unit begins executing a second instruction before the first has been completed. Additionally, current architecture uses speculative execution (executing instructions from different branch paths) and branch prediction to increase performance of the processor. Branch prediction is utilized to predict the way an instruction will branch the next time it is executed and is generally correct 90 percent of the time.

Figure 4:
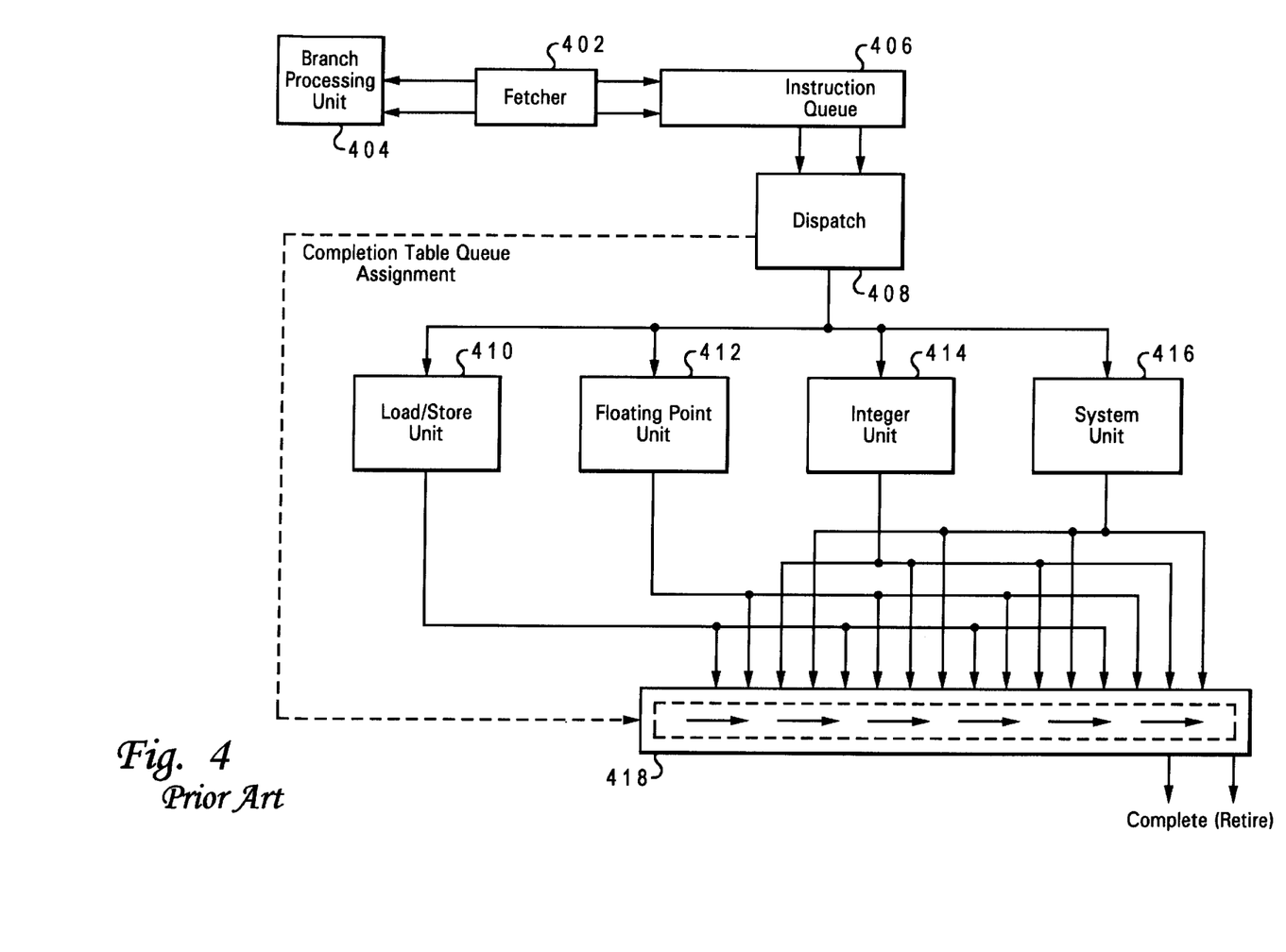
FIG. 4 depicts a high level diagram that illustrates instruction flow through a completion unit within a superscalar processor.

FIG. 4 is a simplified block diagram illustrating instruction flow in a superscalar processor. Multiple instructions are retrieved from the instruction cache by the fetcher 402 and placed in either the Branch Processing unit 404 or the Instruction Queue 406. After entering the Instruction Queue 406, instructions are issued to the various execution units by the dispatch unit 408. The dispatch rate is contingent on, among other things, the execution unit busy status, rename buffer availability (not shown) and completion table buffer availability. In current processors instruction completion logic is performed in a single unit, the completion unit, within the processor. Completion unit 418, tracks instructions from dispatch through execution and finish, allowing for out of order execution of instructions. Status of an instruction is transmitted by execution unit 410, 412, 414 or 416 to completion table 418 when that execution unit finishes with the instruction.

The completion unit then completes, or retires, the instruction and sends a completion signal to the remaining execution units, allowing write-back of finished data into architected registers.

However, there is a fixed number of instructions that may be completed or retired per cycle by the completion unit; a limiting factor that may lead to a bottle-neck in the instruction dispatch logic. All instructions are tracked, completed and committed to specific architected registers by completion unit 418. One reason that the processor 400 may drop in efficiency and speed if the completion unit 418 stalls is that execution units 410, 412, 414, and 416 cannot send a finish signal to update a corresponding instruction status in completion unit 418. The execution units 410, 412, 414, and 416 stall because finish signals cannot be transmitted to a full completion unit 418 queue. The backup continues because rename buffers (not shown) cannot now transfer instructions to execution units 410, 412, 414, and 416. The dispatch unit 408 makes the determination that the rename buffers are full and there is no room for additional instructions. So, the dispatch unit 408 will not dispatch an instruction, unless there is space available in the rename buffers, causing the processor to stall.

A second reason for a completion unit 418 bottleneck is that the completion unit 418, though it is capable of retiring multiple instructions at the same time, must retire instructions in program order. If the instruction in completion unit 418, entry 0 (the first instruction retiring position), is unable to be retired because an instruction is still being executed, instruction completion can be stalled.

The speed of processors capable of executing multiple instructions per clock cycle is limited by the ability of the processor's completion table to complete or retire instructions.

It would be desirable therefore, to provide a method and apparatus for completing instructions in a manner that would eliminate the bottleneck posed by conventional completion units.

It would also be desirable to complete more instructions per cycle. It would further be desirable to improve the efficiency of the completion table in retiring instructions.

SUMMARY OF THE INVENTION

It is therefore one object of the present invention to improve processor performance by completing more instructions per cycle.

It is another object of the present invention to eliminate the instruction completion bottleneck caused by a conventional completion unit.

It is yet another object of the present invention to provide a method and apparatus that will improve efficiency of the completion table in retiring instructions.

The foregoing objects are achieved as is now described. Each execution unit within a superscalar processor has an associated completion table that contains a copy of the status of all instructions dispatched but not completed. A central completion table maintains the status of every dispatched instruction as reported by the dispatch unit and the individual execution units. Execution units send finish signals to the completion table responsible for retiring a particular type of instruction. The central completion table retires instructions that may cause an interrupt and instructions whose results may target the same register. The execution units' associated completion tables retire the balance of the instructions and the execution units send instruction status to the central completion table and to each execution unit. This reduces the number of instructions that are retired by the central completion table, increasing the number of instructions retired per clock cycle.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
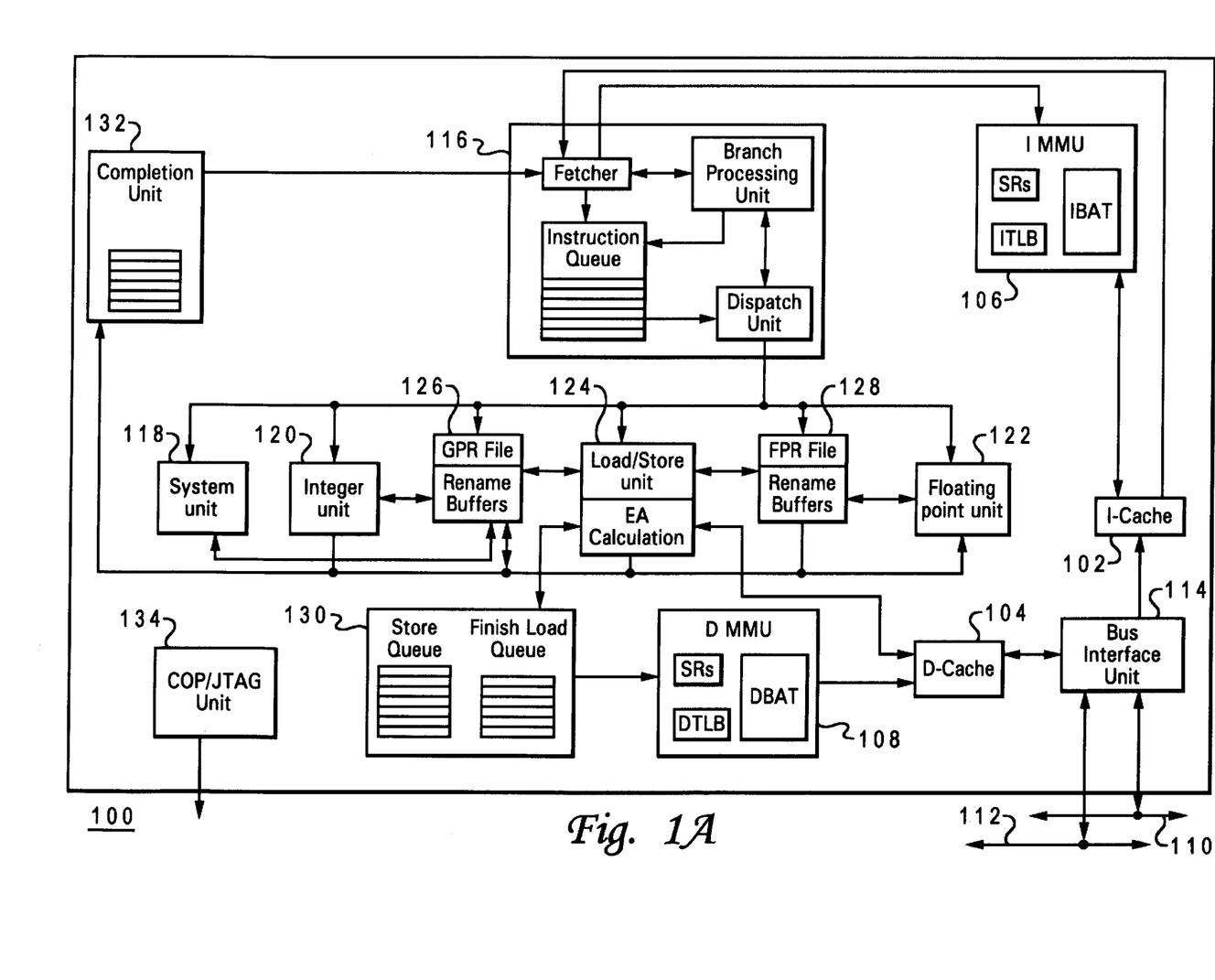
FIG. 1A depicts a high level block diagram of a processor and related portions of a data processing system in which a preferred embodiment of the present invention may be implemented.

With reference now to the figures, and in particular with reference to FIG. 1A, a block diagram of a processor and related portions of a data processing system, in which a preferred embodiment of the present invention may be implemented, is depicted. Processor 100 is a single integrated circuit superscalar processor, such as the PowerPC™ processor available from IBM Corporation of Armonk, N.Y. Accordingly, processor 100 includes various units, registers, buffers, memories, and other sections, all of which are formed by integrated circuitry. Processor 100 also operates according to reduced instruction set computing ("RISC") techniques.

Processor 100 includes level one (L1) instruction and data caches ("I Cache" and "D Cache") 102 and 104, respectively, each having an associated memory management unit ("I MMU" and "D MMU") 106 and 108. As shown in FIG. 1, processor 100 is connected to system address bus 110 and to system data bus 112 via bus interface unit 114. Instructions are retrieved from system memory (not shown) to processor 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue and a dispatch unit.

The dispatch unit within instruction unit 116 dispatches instructions as appropriate to executions units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128.

Load/store unit 124 loads instruction operands from data cache 104 into integer or floating point registers 126 or 128 as needed, and stores instructions results when available from integer or floating point registers 126 or 128 into data cache 104. Load and store queues 130 are utilized for these transfers from data cache 104 to and from integer or floating point registers 126 or 128. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor ("COP") and joint test action group ("JTAG") unit 134 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 1B:
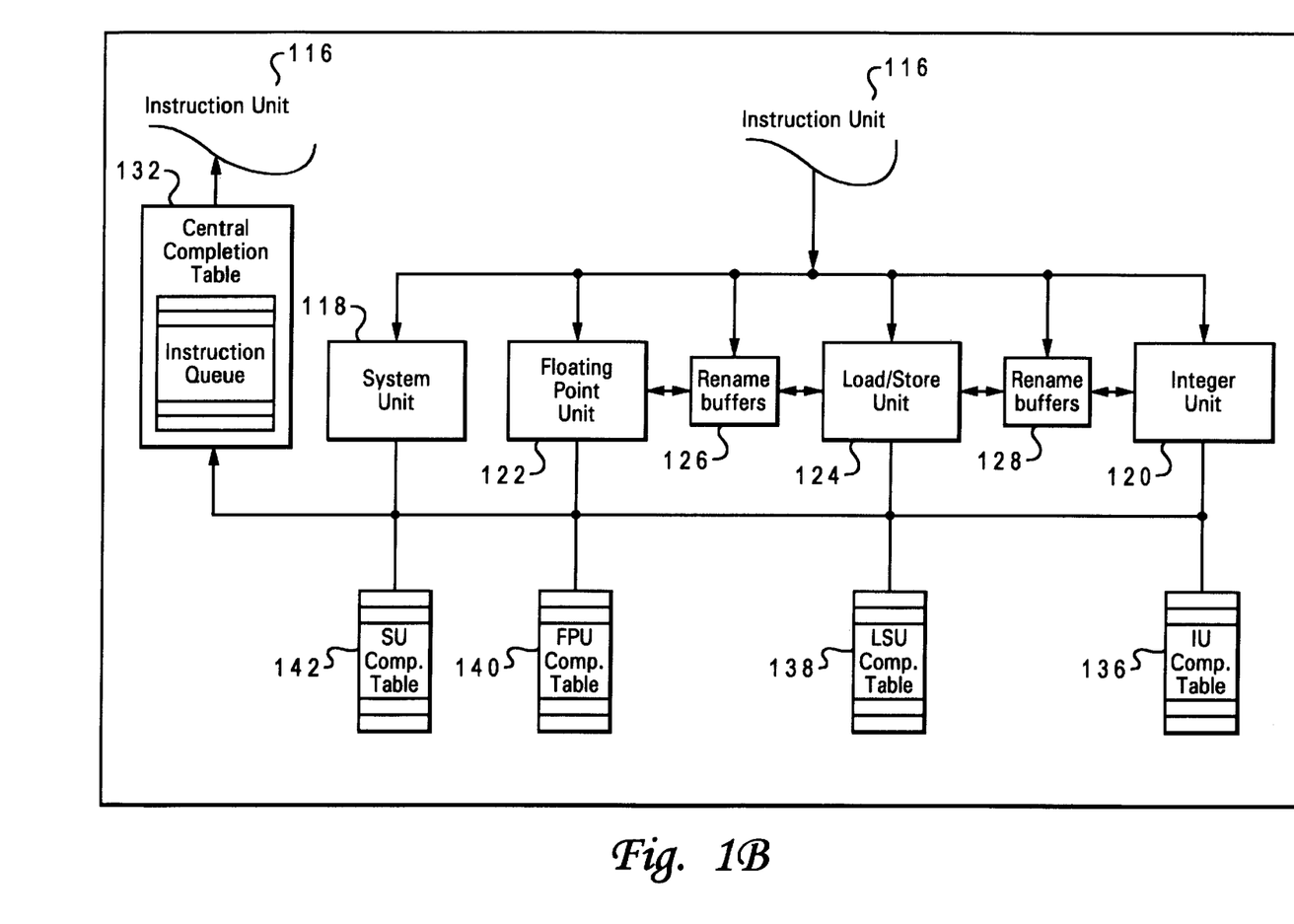
FIG. 1B is a high level block diagram of a data processor with multiple execution units and multiple completion tables in accordance with a preferred embodiment of the present invention.

With reference now to FIG. 1B, a high level block diagram of a processor with multiple execution units and multiple completion tables in accordance with a preferred embodiment of the present invention, is depicted. Central completion table 132 controls all instruction retirement. Central completion table 132 has an instruction queue with a fixed number of retirement positions, limiting the output. In the present invention, additional completion tables are added to the processor and each execution unit has an instruction completion table for completing instructions not completed by the Central completion table 132.

Each execution unit is responsible for completing its own type of instructions. The execution unit broadcasts the completion information to other execution units and to a Central completion table. Multiple completion tables, operating in parallel, would allow a higher rate of instruction completion. By reducing the number of instructions handled by the central completion table 132, the rate of completion is increased and the Central completion table 132 queue is emptied faster; increasing the rate of completion, the completion table queue is emptied faster; thereby, providing a higher instruction dispatch rate per cycle since the rename buffers are also released faster.

In FIG. 1A, the operation of the major components of the processor was described. In FIG. 1B, the operation of the processor is basically the same, with the exception of additional completion tables 136, 138, 140 and 142. Each execution unit; integer unit 120, load/store unit 124, floating point unit 122 and system unit 118 has an associated completion table. If the rename buffers 126 and 128 are open, instructions are sent from the Instruction unit 116 and received by an execution unit, for example floating point unit 122. The individual execution unit, in this case floating point unit 122, determines the type of instruction, finishes the instruction and sends the finish information to the Central completion table 132 and the floating point unit 122 associated completion table 140. Depending on the type of instruction, the Central completion table 132 or the completion table 140 will retire the instruction to a specific architected register.

The instruction completion queue in the central completion table 132 becomes less crowded by transferring instructions, ordinarily retired by the central completion table 132, to the execution unit completion tables 136, 138, 140 and 142. This reduction of instructions to the central completion table 132 provides a higher overall throughput.

Figure 2:
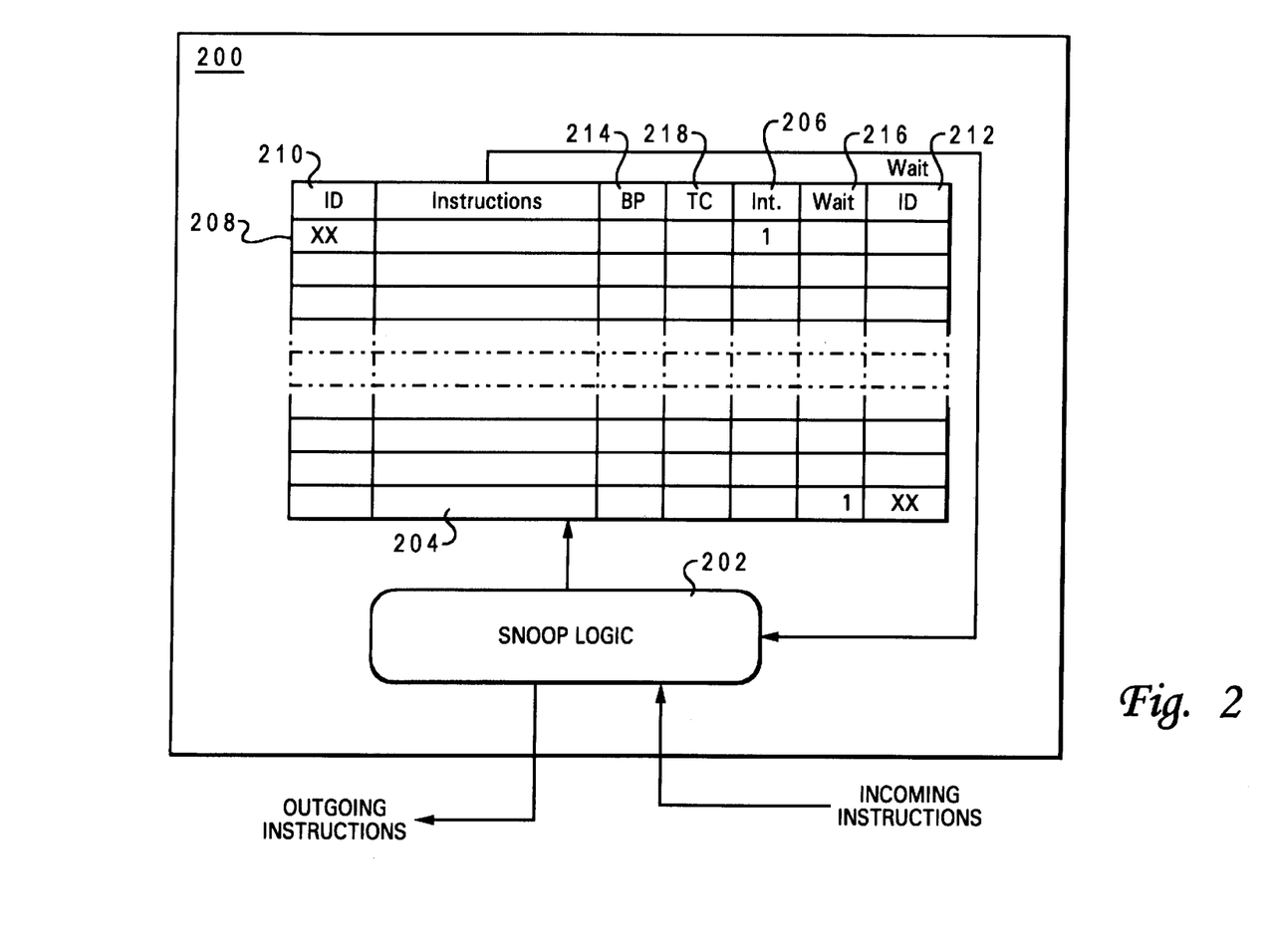
FIG. 2 depicts a central completion table instruction queue in accordance with a preferred embodiment of the present invention.

Referring now to FIG. 2, a central completion table instruction queue 200 in accordance with a preferred embodiment of the present invention, is illustrated. Central completion table instruction queue 200 is used to maintain the status of all instructions in the machine. Instructions may be completed out of order with respect to each other and an instruction must not be allowed to complete if a previous instruction, that may cause an interrupt, exists in the processor pipeline. Preventing an instruction from completing out of order is accomplished by having an "interruptible bit" applied to the instruction by the dispatch unit for each entry in the completion table instruction queue 200 that may cause an interrupt.

In the present invention, snoop logic 202 is applied to incoming instructions, such as 204, allowing snooping of central completion table instruction queue 200 to determine whether any older instruction has interruptible bit 206 turned on.

Incoming instruction 204 has multiple parts that, among other things, determine what to do with the instruction, when to complete the instruction and whether there are related instructions within the queue. Parts of the instruction that are significant to the present invention are illustrated in FIG. 2. For instance, ID 208 is the instruction identifier and is what distinguishes a particular instruction within the queue. The body, or instruction, is identified in the illustrated table by the heading "Instructions." "Int." 206 is an "interruptible" bit included in the finished instruction to identify an older instruction that may cause an interrupt in the instruction flow. The processor will be able to complete instructions out of order with respect to each other and still maintain program order by using the interruptible bit.

Branch pending bit BP 214 indicates that the instruction is in an unresolved branch path. when the branch is resolved, this bit is turned off to indicate the instruction is no longer speculative. TC 218 is a bit placed by the dispatch unit after the dispatch unit snoops the central completion table and determines there is an older instruction that has targeted the same register. When the TC 218 bit is on, the older instruction is must be completed by the central completion table. Wait bit 216 is a bit within the incoming instruction that is turned on when an interruptible instruction, such as instruction 208, is detected. Instruction ID 208 is then latched in with the wait ID 212 of the incoming instruction 204 by turning on wait bit 216 of instruction 204. When the older, interruptible instruction ID 208 is complete, it can now simply be snooped by instruction 204. The instruction ID 208 is compared to wait ID 212 of instruction 204 and if the ID's match, wait bit 216 of instruction 204 is turned off. Instruction 204 can then be completed if ready.

Incoming instruction 204 simply snoops the central completion table instruction queue 200 for an interruptible instruction ID, in this case, instruction 208. When older instruction 208 is completed, ID 210 of instruction 208 is compared with wait ID 212 of instruction 204 in the completion queue. If there is a match, wait bit 216 is turned off and instruction 204 can be completed.

Figure 3:
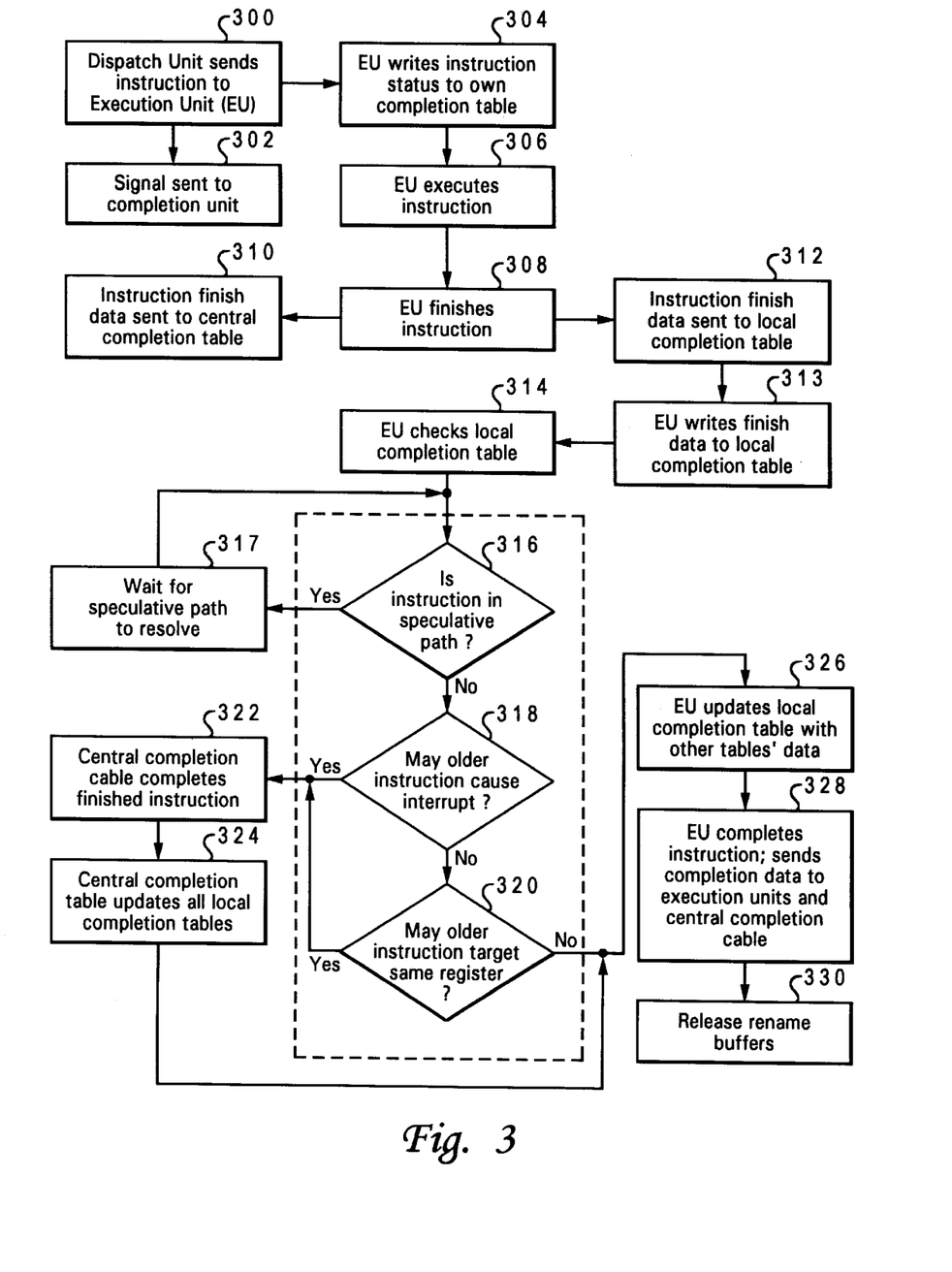
FIG. 3 is a high level flowchart illustrating the method of distributed completion logic in accordance with a preferred embodiment of the present invention.

With reference to FIG. 3, a high level flowchart illustrating the process of distributed completion logic, in accordance with a preferred embodiment of the present invention, is depicted. The process begins with step 300 which depicts the dispatch unit sending an instruction to an execution unit. At the same time the dispatch unit sends the instruction to the execution unit, process passes to step 302 which illustrates a signal, indicating an instruction dispatch to the execution unit, being sent to the central completion unit. The process continues with step 304 which illustrates the execution unit writing the instruction status to its local completion table.

The process then proceeds to step 306 which depicts the execution unit executing the instruction received. The process then passes to step 308 which illustrates the execution unit finishing the instruction. The process next passes to step 310 which depicts the execution unit sending a finish signal to the central completion table. This step updates the status of the instruction within the central completion table. Simultaneously, the process passes to step 312 which illustrates the finish signal also being sent to the completion table of the execution unit. The process continues to step 313 which illustrates the execution unit writing the results of the finished instruction to its completion table.

The process next passes to step 314 which depicts the execution unit checking the associated completion table to determine what type of instruction has been executed. The process then proceeds to step 316 which illustrates one of three checks made by the execution unit to determine the type of instruction. Step 316 illustrates the check to determine whether the instruction is in a speculative path. If the instruction is in a speculative path, the process then proceeds to step 317, which depicts the execution unit waiting for the speculative path to resolve itself. The process then returns to step 316 and continues until the speculative path is resolved.

If the instruction is not in a speculative path, the process next passes to step 318 which depicts the execution unit checking whether there is an older instruction in its completion table which has not completed, but can cause an interrupt (such as a load or store instruction). If the older instruction in the completion table of the execution unit may cause an interrupt, the process then passes to step 322 which illustrates the central completion table completing (retiring) the finished instruction. The central Completion table clears out the completed instructions by committing the instruction to a target address, or discards the instruction due to an interrupt or wrong branch prediction. When the central completion table completes the instruction it broadcasts completion information to the execution unit to update all completion tables in the processor. After completing the finished instruction, the process next passes to step 324 which depicts the central completion table updating the individual completion tables of the execution units with the completion information. If the older instruction would not cause an interrupt, the process then proceeds to step 320 which illustrates the execution unit checking whether the older instruction may have the same target register as the instruction. If it does, the process passes to step 322 and step 324 which is discussed above.

The process next passes to step 326 which depicts the execution unit updating its completion table and all the other completion tables, including the central completion table.

The process then proceeds to step 328 which illustrates the execution unit completing the instruction. The execution unit also sends completion data to all the other execution units and to the central completion table. If the instruction can be retired by the execution unit completion table, the execution unit will complete it. The process then proceeds to step 330 which depicts the execution unit updating the appropriate architected registers and releasing all the rename buffers associated with the instruction.

The process divides instructions between the central completion table and the individual completion tables of the execution units. Each completion table can handle instructions from different branch paths by including a branch pending bit for each instruction when dispatched. The branch pending bit, if turned on, indicates that the instruction is in an unresolved branch path. When the branch is resolved, this bit is turned off to indicate the instruction is no longer speculative. By sending particular instructions to the local completion table to complete, rather than the central completion table, the number of instructions the central completion table has to track and retire is reduced. This frees up space on the central completion table instruction queue, thus speeding up instruction flow.

In summary, instruction flow, that may be inhibited by conventional completion table within a processor, may be improved in the present invention by the distributed completion scheme and multiple completion tables. Multiple completion tables, operating in parallel, would allow a higher rate of instruction completion. Each execution unit completes its own type of instructions and broadcasts completion information to the other execution units and a central completion table. By reducing the number of instructions handled by the central completion table, completion rate is increased. The central completion table queue is emptied faster, increasing the rate of instruction completion. As the central completion table queue is emptied at a faster rate, a higher instruction dispatch rate per cycle is achieved.

While the invention has been particularly shown and described with reference to a preferred embodiment, it will be understood by those skilled in the art that various changes in form and detail may be made therein without departing from the spirit and scope of the invention.

What is claimed is:

1. A method for completing instructions in a superscalar processor, comprising:
    dispatching a first instruction to a first execution unit having a first completion table associated solely with the first execution unit;
    writing a status of the first instruction to the first completion table associated with the first execution unit;
    dispatching a second instruction to a second execution unit having a second completion table associated solely with the second execution unit;
    writing a status of the second instruction to the second completion table associated wth the second execution unit;
    writing the status of the instructions to a central completion table;
    sending an instruction completion signal for the first instruction to the first completion table associated with the first execution unit; and
    sending an instruction completion signal for the second instruction to the second completion table associated with the second execution unit.

2. A method for completing instructions in a superscalar processor, comprising:
    dispatching an instruction to an execution unit by
        snooping an instruction queue within the central completion table for any older instruction having an associated interruptible bit turned on,
        turning on a wait bit of the instruction, and
        latching a wait ID of the instruction with an ID of the any older instruction having an interruptible bit turned on;
    writing a status of the instruction to a completion table associated with the execution unit;
    writing the status of the instruction to a central completion table; and
    sending an instruction completion signal to the completion table associated with the execution unit.

3. The method in claim 2, wherein the step of snooping an instruction queue within the central completion table for any older instruction having an associated interruptible bit turned on further comprises:
    determining whether the older instruction may cause an interrupt.

4. The method in claim 2, further comprising:
    responsive to the completion of an instruction older than the instruction:
        comparing the wait ID of the instruction to the ID of any older instruction;
        turning off the wait bit if the wait ID of the instruction matches the ID of the any older instruction; and
        completing the instruction.

5. The method in claim 4, wherein the step of dispatching an instruction to an execution unit further comprises,
    determining whether the instruction is in a speculative path.

6. The method in claim 5, further comprising:
    determining the instruction is in a speculative path; and
    sending the finish signal to the central completion table.

7. The method in claim 5, further comprising,
    determining whether a second older instruction may target the same register as the instruction.

8. The method in claim 7, further comprising,
    writing finish data to the completion table associated with the execution unit.

9. The method in claim 8, further comprising,
    updating the completion table associated with the execution unit.

10. The method in claim 9, further comprising:
    completing the instruction; and
    sending completion data to all execution units and the central completion table.

11. The method in claim 10, further comprising:
    determining the any older instruction may cause an interrupts and
    sending a second finish signal, associated with the older instruction, to the central completion table.

12. The method in claim 11, further comprising:
    determining a second older instruction may target the same register as the instruction; and
    sending a finish signal, associated with the different older instruction, to the central completion table.

13. The method in claim 12, further comprising:
    completing the instruction or the older instruction or the second older instruction; and
    updating the completion table associated with the execution unit and the central completion table.

14. A processor, comprising:
    an instruction unit;
    a plurality of execution units;
    a plurality of completion tables;
    a central completion table;
    means, responsive to receiving a command to dispatch an instruction, for dispatching a first instruction from the instruction unit to a first execution unit having a first completion table associated solely with the first execution unit;
    means for writing a status of the instruction to the first completion table associated with the first execution unit;
    dispatch means for dispatching a second instruction to a second execution unit having a second completion table associated solely with the second execution unit;

means for writing a status of the second instruction to the second completion table associated solely with the second execution unit;

means for writing the status of the instructions to the central completion table;

means for sending an instruction completion signal for the first instruction to the first completion table associated with the first execution unit; and means for sending an instruction completion signal for the second instruction to the second completion table associated with the second execution unit.

15. A processor, comprising:

an instruction unit;

a plurality of execution units;

a plurality of completion tables;

a central completion table;

means, responsive to receiving a command to dispatch an instruction, for dispatching an instruction from the instruction unit to one of a plurality of execution units for execution;

means for snooping an instruction queue within the central completion table for any older instruction having an associated interruptible bit turned on;

means for turning on a wait bit of the instruction; and means for latching an instruction ID with a wait ID of the any older instruction having an interruptible bit;

means for writing a status of the instruction to one of a plurality of completion tables associated with the one of a plurality of execution units;

means for writing the status of the instruction to the central completion table;

means for sending an instruction completion signal to the one of a plurality of completion tables associated with the one of a plurality of execution units.

16. The processor in claim 15, further comprising:

responsive to the completion of any older instruction than the instruction, means for comparing the instruction ID to the wait ID of the any older instruction;

means for turning off the wait bit if the instruction ID matches the wait ID of the any older instruction; and means for completing the instruction.

17. The processor in claim 16, further comprising:

means for determining whether the instruction is in a speculative path.

18. The processor in claim 17, further comprising:

means for determining whether the any older instruction may cause an interrupt.

19. The processor in claim 18, further comprising:

means for determining whether a second older instruction may target the same register as the instruction.

20. The processor in claim 19, further comprising:

means for writing finish data to the one of a plurality of completion tables associated with the one of a plurality of execution units.

21. The processor in claim 20, further comprising:

means for updating the one of a plurality of completion tables associated with the one of a plurality of execution units.

22. The processor in claim 21, further comprising:

means for completing the instruction; and means for sending completion data to all execution units and the central completion table.

23. The processor in claim 22, wherein the means for determining whether the instruction is a speculative path further comprises:

means for sending the finish signal to the central completion table.

24. The processor in claim 23, wherein the means for determining that the older instruction may cause an interrupt, further comprises:

sending a second finish signal, associated with the older instruction, to the central completion table.

25. The processor in claim 24, wherein the means for determining that a different older instruction may target the same register as the instruction, further comprises:

means for sending a finish signal, associated with the second older instruction, to the central completion table.

26. The processor in claim 25, further comprising:

means for completing the instruction or the any older instruction or the second older instruction; and means for updating the one of a plurality of completion tables associated with the one of a plurality of execution units and the central completion table.

* * * * *